(12) United States Patent
Takigawa

(10) Patent No.: US 12,327,995 B2
(45) Date of Patent: Jun. 10, 2025

(54) GROUNDING DEVICE, GROUNDING METHOD, AND PROGRAM RECORDING MEDIUM

(71) Applicant: NEC Corporation, Tokyo (JP)

(72) Inventor: Yoshinari Takigawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 78 days.

(21) Appl. No.: 18/266,314

(22) PCT Filed: Dec. 3, 2021

(86) PCT No.: PCT/JP2021/044405
§ 371 (c)(1),
(2) Date: Jun. 9, 2023

(87) PCT Pub. No.: WO2022/131013
PCT Pub. Date: Jun. 23, 2022

(65) Prior Publication Data
US 2024/0039273 A1     Feb. 1, 2024

(30) Foreign Application Priority Data

Dec. 18, 2020 (JP) ................. 2020-209805

(51) Int. Cl.
*H02H 7/00*     (2006.01)
*H02H 7/20*     (2006.01)

(52) U.S. Cl.
CPC .................... *H02H 7/20* (2013.01)

(58) Field of Classification Search
None
See application file for complete search history.

(56) References Cited

U.S. PATENT DOCUMENTS 3,801,729 A * 4/1974 Portinari ............... H01B 9/028
                                           174/106 R
5,052,962 A * 10/1991 Clark ...................... C23F 13/02
                                           440/83

(Continued)

FOREIGN PATENT DOCUMENTS

JP    H04-323917 A    11/1992
JP    H05-327561 A    12/1993

(Continued)

OTHER PUBLICATIONS

International Search Report for PCT Application No. PCT/JP2021/044405, mailed on Jan. 11, 2022.

(Continued)

*Primary Examiner* — Stephen W Jackson

(57) ABSTRACT

In order to provide a grounding device and the like which can suppress generation of heat generated due to a rush current when a feed line is grounded, a grounding device according to the present invention comprises: an in-submarine-apparatus feed line which is installed in a submarine apparatus and which supplies power to an electrical component in the submarine apparatus; a determination means for determining whether or not the temperature of an impedance circuit which is to be connected between the feed line and a sea earth and which has a predetermined impedance exceeds a threshold value; and a first connection means for connecting two terminals of the impedance circuit when the temperature exceeds the threshold value as a result of the determination.

10 Claims, 5 Drawing Sheets

(56) References Cited

U.S. PATENT DOCUMENTS

| | | | |
|---|---|---|---|
| 6,806,423 B1* | 10/2004 | Harris | B63B 43/00 |
| | | | 174/101.5 |
| 10,666,044 B2* | 5/2020 | Yamaguchi | H04B 3/44 |
| 2019/0393696 A1 | 12/2019 | Tada et al. | |
| 2021/0090822 A1 | 3/2021 | Yamaguchi | |

FOREIGN PATENT DOCUMENTS

| | | |
|---|---|---|
| JP | 2002-057607 A | 2/2002 |
| JP | 2011-073622 A | 4/2011 |
| WO | 2019/031415 A1 | 2/2019 |

OTHER PUBLICATIONS

English translation of Written opinion for PCT Application No. PCT/JP2021/044405, mailed on Jan. 11, 2022.

* cited by examiner

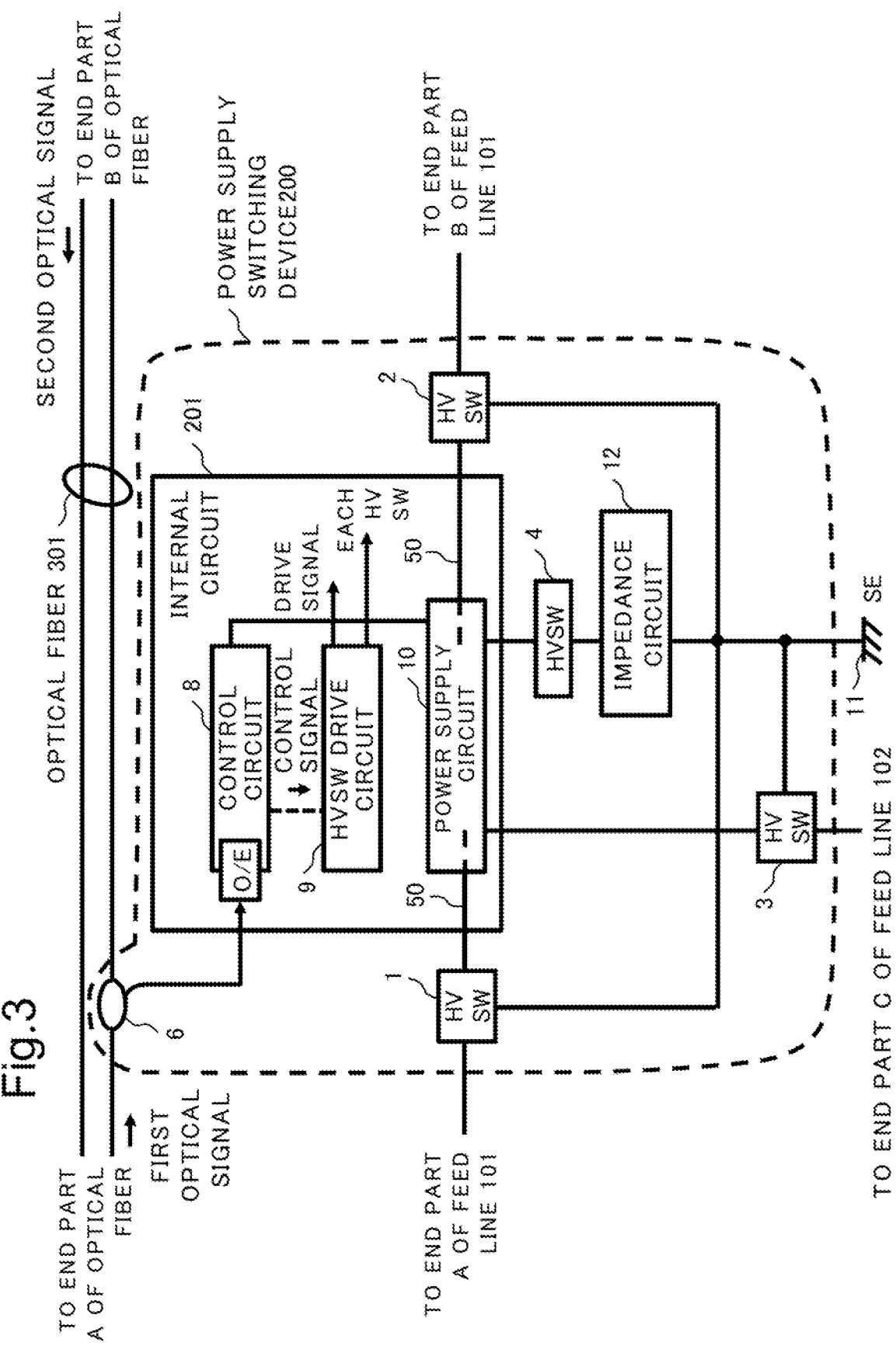

GROUNDING DEVICE, GROUNDING METHOD, AND PROGRAM RECORDING MEDIUM

This application is a National Stage Entry of PCT/JP2021/044405 filed on Dec. 3, 2021, which claims priority from Japanese Patent Application 2020-209805 filed on Dec. 18, 2020, the contents of all of which are incorporated herein by reference, in their entirety.

TECHNICAL FIELD

The present invention relates to a device that grounds a feed line in a submarine device.

BACKGROUND ART

A submarine optical cable system for optical communication between land areas includes an optical cable through which an optical signal for communication propagates, and a submarine apparatus such as a repeater for relay transmission of the optical signal. The optical cable includes a bundle of optical fibers for communication, a feed line for transmitting power to the submarine apparatus, and a cladding material for protecting the bundle of the optical fibers and the feed line.

A submarine optical cable system is generally equipped with a branching unit (BU) for branching an optical signal. FIG. 1 is a conceptual diagram illustrating a configuration of a power supply system 100, which is an example of a general power supply system included in a submarine optical cable system including the branching unit. The power supply system 100 includes a feed line 101 and a feed line 102. A power supply switching device 200 included in the above-described branching unit is installed between the feed line 101 and the feed line 102. A configuration example of the power supply switching device 200 is illustrated in FIG. 3.

The feed line 101 is a feed line that connects an end part A, which is one end part of a feed line of a trunk connected to a power supply unit of a land station installed on a first land, to an end part B, which is another end part of the trunk connected to a power supply unit of a land station installed on a second land. Further, the feed line 102 is a feed line that connects an end part C, which is a one end part of a feed line of a branch connected to a power supply unit of a land station installed on a third land, to a sea earth (SE) 11, which is a sea earth installed near the power supply switching device 200.

In FIG. 1, the power supply switching device 200 connects, via a feed line in an internal circuit 201, the feed line 101 between the end part A and the power supply switching device 200 to the feed line 101 between the end part B and the power supply switching device 200. A configuration example of the internal circuit 201 is illustrated in FIG. 3. Further, the power supply switching device 200 connects the feed line 102 between the end part C and the power supply switching device 200 to the SE 11.

A feed line in the power supply switching device 200 connected to the feed line 102 is at a low potential because the feed line is close to a point connected with the SE11. Meanwhile, a feed line in the power supply switching device 200 connected to the feed line 101 is at a high voltage of several kV to more than ten kV, depending on a system configuration, because there is no point connected to the SE 11 nearby the feed line. Note that, in the power supply system 100, power is supplied by supplying DC voltage.

Generally, the power supply switching device 200 has a function of switching a feed line when a ground fault in which any point on the feed line 101 between the end part A and the power supply switching device 200 or the feed line 101 between the end part B and the power supply switching device 200 is grounded occurs. FIGS. 2A to 2E is a conceptual diagram illustrating the power supply switching device 200 switching a feed line due to a fault.

FIG. 2A is a diagram illustrating a connection state of the feed line in the power supply switching device 200 in a case where no ground fault occurs. The connection state in FIG. 2A is the same as a connection state of the feed line in FIG. 1.

Herein, it is assumed that a ground fault in which the feed line between the end part A and the power supply switching device 200 is grounded occurs. In that case, the power supply switching device 200 shifts a connection state to a connection state in FIG. 2C via a connection state in FIG. 2B.

The connection state in FIG. 2B is a state in which the power supply switching device 200 grounds the feed line in the internal circuit 201 to the SE 11. In this state, a potential of the feed line in the internal circuit 201 is near zero due to connection to the SE 11. Further, the state in FIG. 2C is a connection state in which the power supply switching device 200 connects the feed line from the end part A to the SE 11, disconnects the feed line from the end part B from the feed line from the end part A, and connects the feed line from the end part B to the feed line from the end part C.

It is assumed that, later on, there is no longer the ground fault in which the feed line between the end part A and the power supply switching device 200 is grounded. In that case, the power supply switching device 200 restores the connection state of the feed line to the connection state in FIG. 2A via the connection state in FIG. 2B.

Further, it is assumed that a ground fault in which the feed line between the end part B and the power supply switching device 200 is grounded occurs. In that case, the power supply switching device 200 shifts a connection state to a connection state in FIG. 2E via a connection state in FIG. 2D.

The connection state in FIG. 2D is a state in which the power supply switching device 200 grounds the feed line in the internal circuit 201 to the SE11. In this state, a potential of the feed line in the internal circuit 201 is near zero due to connection to the SE 11. Further, the state in FIG. 2E is a connection state in which the power supply switching device 200 connects the feed line from the end part B to the SE 11 after disconnecting the feed line from the end part B from the feed line from the end part A, and connects the feed line from the end part A to the feed line from the end part C.

It is assumed that, later on, there is no longer the ground fault in which the feed line between the end part B and the power supply switching device 200 is grounded. In that case, the power supply switching device 200 restores the connection state of the feed line to the connection state in FIG. 2A via the connection state in FIG. 2D.

In this way, when a ground fault occurs at any location on the trunk or the ground fault is recovered, the power supply switching device 200 always goes through the connection state in FIG. 2B or FIG. 2D, instead of directly shifts to a target connection state.

FIG. 3 is a conceptual diagram illustrating a configuration example of the power supply switching device 200. The power supply switching device 200 includes an internal circuit 201, an impedance circuit 12, HVSWs 1 to 4, and an optical coupler 6. Herein, the HVSW refers to a high voltage switch. The internal circuit 201 includes a feed line 50, a control circuit 8, an HVSW drive circuit 9, and a power supply circuit 10. The feed line 50 passes through the power supply circuit 10.

A combination of an optical fiber 301 and the feed line 101 is included in a submarine optical cable. Optical fibers included in the optical fiber 301 includes an optical fiber in which a first optical signal from an end part A to an end part B of the optical fiber 301 propagates, and an optical fiber in which a second optical signal from the end part B to the end part A of the optical fiber 301 propagates. The first optical signal includes a control optical signal for controlling operation of the power supply switching device 200. The control circuit 8 controls the HVSW drive circuit 9 according to a control signal acquired by converting the control optical signal included in the first optical signal separated by the optical coupler 6 into an electrical signal. Note that, a part included in the control circuit 8 and illustrated as O/E is a part that converts the input first optical signal into an electrical signal. The HVSW drive circuit 9 sends, to each of the HVSWs 1 to 4, a drive signal associated to a received control signal.

The power supply circuit 10 converts feeding voltage supplied to the feed line 50 from any one of the end part A, the end part B, and the end part C into a predetermined voltage, and supplies power to each electrical component in the internal circuit 201. The feed line 50 is a feed line between the HVSW 1 and the HVSW 2.

In the connection state in FIG. 2A, the HVSW 1 connects, according to a drive signal from the HVSW drive circuit 9, the end part A of the feed line 101 to the feed line 50, and disconnects the end part A and the feed line 50 from the SE 11. Further, the HVSW 2 connects, according to a drive signal from the HVSW drive circuit 9, the end part B of the feed line 101 to the feed line 50, and disconnects the end part B and the feed line 50 from the SE 11. Further, the HVSW 3 connects, according to a drive signal from the HVSW drive circuit 9, the end part C of the feed line 102 to the SE 11, and disconnects the end part C and the SE 11 from the feed line 50.

Herein, it is assumed that the power supply switching device 200 shifts, according to the above-described control optical signal, the connection state in FIG. 2A to the connection state in FIG. 2B or FIG. 2D. In that case, the HVSW 1 disconnects, according to a drive signal, a connection destination of a terminal of the HVSW 1 connected to the end part A of the feed line 101, from the feed line 50. Further, HVSW 2 disconnects, according to a drive signal, a connection destination of the end part B of the feed line 101, form the feed line 50. Meanwhile, the HVSW 3 maintains, according to a drive signal, a state in which the end part C of the feed line 102 is connected to the SE 11 and the end part C and the SE 11 are disconnected from the feed line 50. After that, the HVSW 4 connects, according to a drive signal, the feed line 50 to the SE 11 via the impedance circuit 12. The impedance circuit 12 is a circuit having a predetermined impedance, suppresses a value of current generated when the HVSW 4 connects the feed line 50 to the SE 11, and protects the power supply circuit 10. Thereby, the feed line 50 is connected to the SE 11 via the impedance circuit 12 while being disconnected from all the end part A, the end part B, and the end part C.

After that, when the power supply switching device 200 shifts, according to the above-described control optical signal, the connection state to the connection state in FIG. 2C, the HVSW 1 connects, according to a drive signal, the end part A of feed line 101 to the SE 11. Next, the HVSW 4 disconnects, according to a drive signal, the feed line 50 form the impedance circuit 12 connected to the SE 11. Further, the HVSW 3 disconnects, according to a drive signal, the end part C of the feed line 102 from the SE 11, and connects the end part C to the feed line 50. Thereby, the end part A of the feed line 101 is connected to the SE 11, the end part B of the feed line 101 is connected to the end part C of the feed line 102 via the feed line 50, and the connection state in FIG. 2C is achieved.

Next, a case is assumed in which the power supply switching device 200 shifts, according to the above-described control optical signal, the connection state to the connection state in FIG. 2E after shifting the connection state to the connection state in FIG. 2D. In that case, the HVSW 2 switches, according to a drive signal, a connection destination of a terminal of the HVSW 2 connected to the end part B of the feed line 101, from the feed line 50 to the SE 11. Next, the HVSW 4 disconnects, according to a drive signal, the impedance circuit 12 connected to the SE 11, from the feed line 50. Further, the HVSW 3 switches, according to a drive signal, a connection destination of a terminal of the HVSW 3 connected to the end part C of the feed line 102, from the SE 11 to the feed line 50. Thereby, the end part B of the feed line 101 is connected to the SE 11, the end part A of the feed line 101 is connected to the end part C of the feed line 102 via the feed line 50, and the connection state in FIG. 2D is achieved.

Herein, PTL 1 discloses a grounding circuit that inhibits opening of a first contact in a closed state when a second contact of a relay connected in parallel to a resistor is opened, and inhibits closing of the first contact in an opened state when the second contact is closed.

CITATION LIST

Patent Literature

PTL 1: International Patent Publication No. WO2019/031415

SUMMARY OF INVENTION

Technical Problem

Herein, a case is assumed in which the connection state in FIG. 2A is shifted to the connection state in FIG. 2B or FIG. 2D. In this case, the feed line 50, which is at a high voltage due to connection of the end part A and the end part B of the feed line 101, is connected by the HVSW 4 to the SE 11 via the impedance circuit 12, and rush current is generated.

As described above, the impedance circuit 12 includes an element having a predetermined impedance, such as a resistor, for protecting an electrical component of the internal circuit 201 by mitigating the rush current. However, a rise in temperature of the entire branching unit due to heat generated in the impedance circuit 12 by the rush current becomes a problem. It is difficult to equip the branching unit, which is a submarine apparatus having a sealed housing, with a mechanism for rapid cooling, such as water cooling or air cooling. Therefore, it is common for the branching unit to dissipate internally generated heat into the sea through a metal chassis having a good thermal conductivity.

However, since there is a limit to heat dissipation capacity of the branching unit, when sufficient cooling cannot be performed for unexpected heat generation, an allowable temperature may be exceeded and an apparatus and the like mounted on the branching unit may be adversely affected.

An object of the present invention is to provide a grounding device and the like that reduce heat generated by current produced when grounding a feed line in a submarine device.

Solution to Problem

An grounding device according to the present invention includes: a determination means for determining whether a temperature of an impedance circuit being a circuit that has a predetermined impedance and is to be connected between a sea earth and an in-submarine-device feed line that is installed in a submarine device and supplies power to an electrical component in the submarine device exceeds a threshold value; and a first connection means for connecting both terminals of the impedance circuit when a result of the determination indicates that the temperature exceeds the threshold value.

An installation method according to the present invention includes: determining whether a temperature of an impedance circuit being a circuit that has a predetermined impedance and is to be connected between a sea earth and an in-submarine-device feed line that is installed in a submarine device and supplies power to an electrical component in the submarine device exceeds a threshold value; and connecting both terminals of the impedance circuit when a result of the determination indicates that the temperature exceeds the threshold value.

A program recording medium records a grounding program that causes a computer to execute: processing of determining whether a temperature of an impedance circuit being a circuit that has a predetermined impedance and is to be connected between a sea earth and an in-submarine-device feed line that is installed in a submarine device and supplies power to an electrical component in the submarine device exceeds a threshold value; and processing of connecting both terminals of the impedance circuit when a result of the determination indicates that the temperature exceeds the threshold value.

Advantageous Effects of Invention

The grounding device and the like according to the present invention reduce heat generated by current produced when grounding a feed line in a submarine device.

Each of FIG. 2A to FIG. 2E is a conceptual diagram illustrating a switching operation of a feed line performed by the branching unit of the general power supply system.

FIG. 3 is a conceptual diagram illustrating a configuration example of a general power supply switching device.

Figure 4:
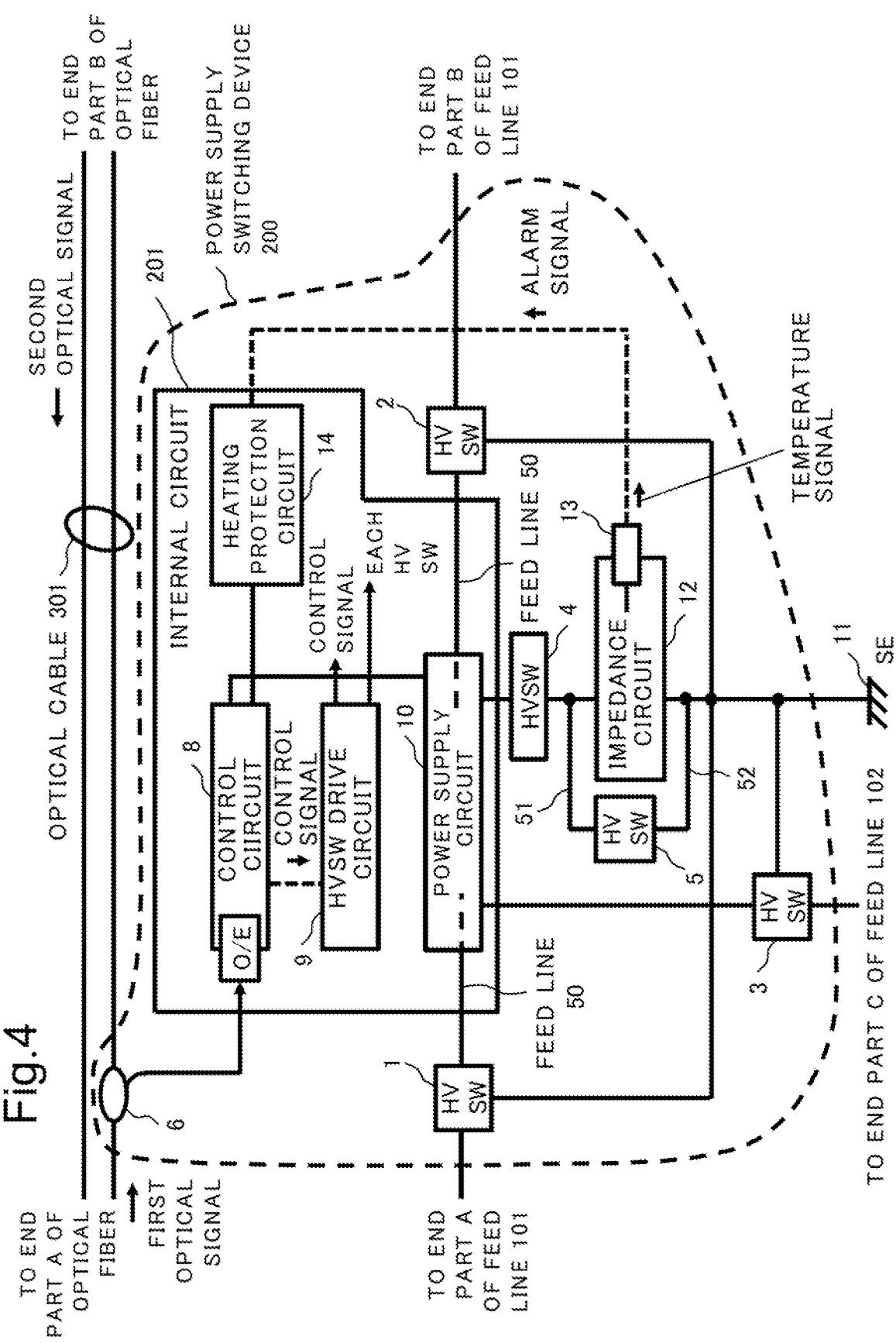

FIG. 4 is a conceptual diagram illustrating a configuration example of a power supply switching device according to the present example embodiment.

Figure 5:
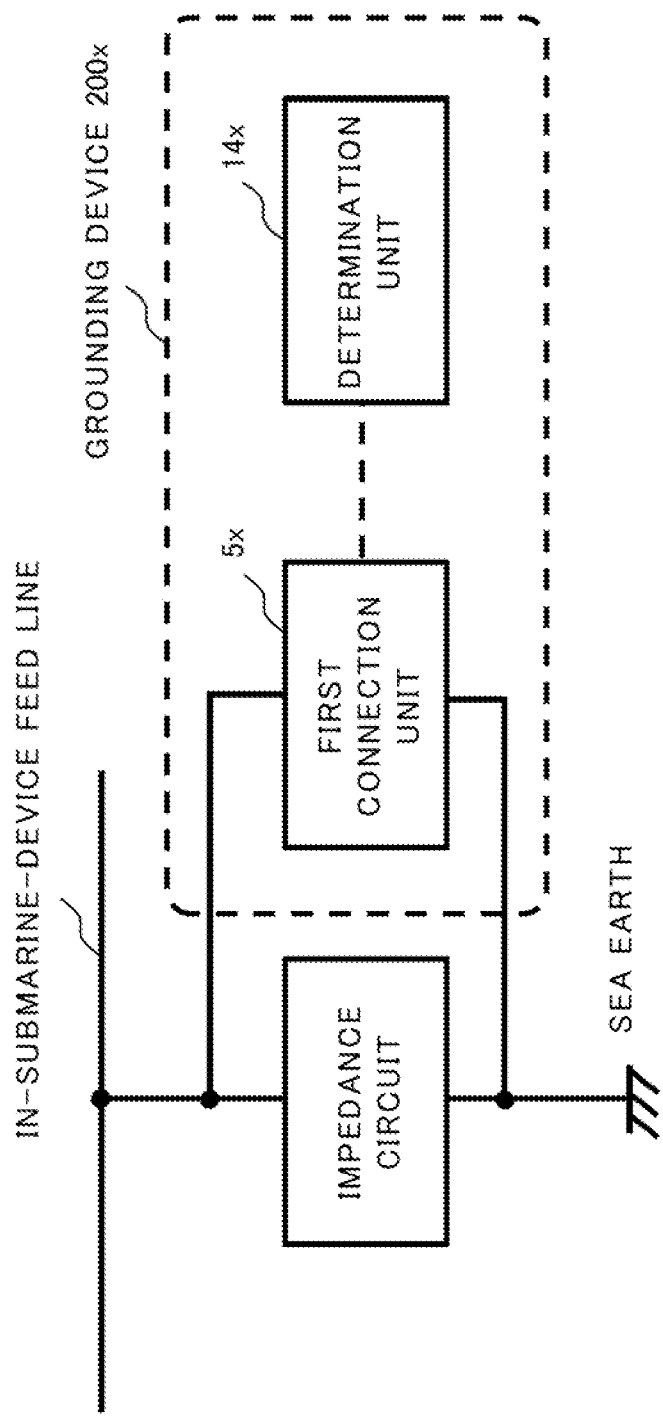

FIG. 5 is a conceptual diagram illustrating a minimum configuration of a grounding device according to the example embodiment.

EXAMPLE EMBODIMENT

Figure 1:
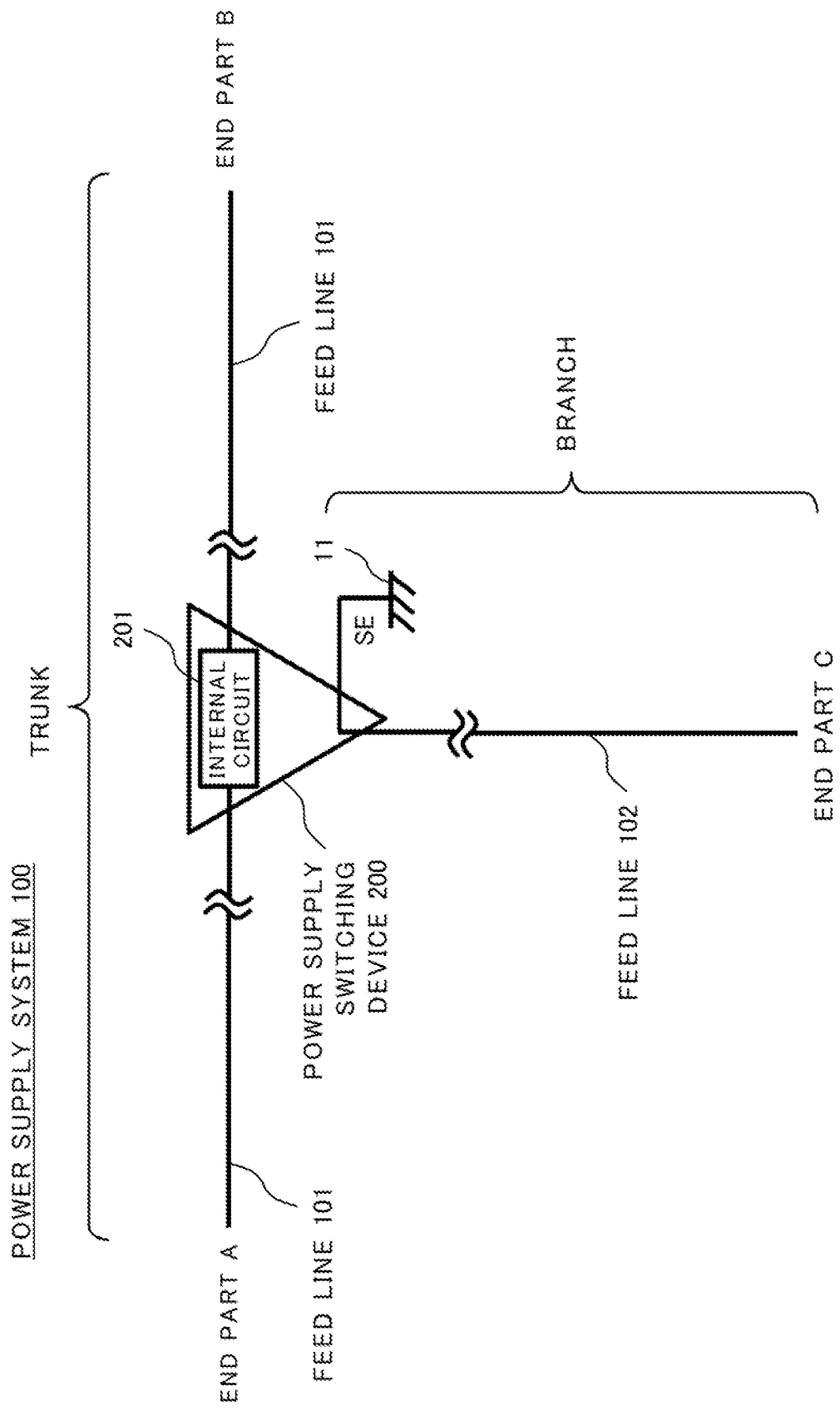
FIG. 1 is a conceptual diagram illustrating a configuration example of a general power supply system for a submarine optical cable system including a branching unit.
Figure 2A:
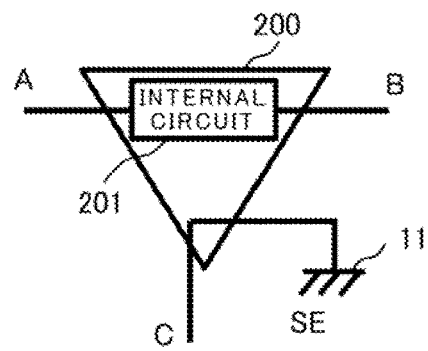
Figure 2B:
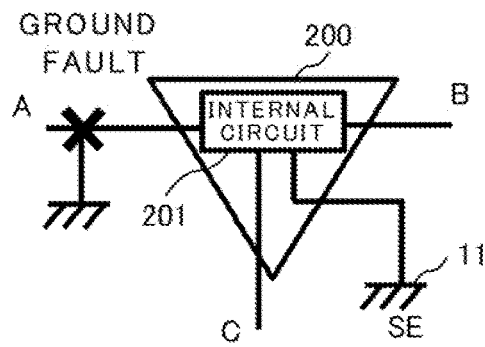
Figure 2C:
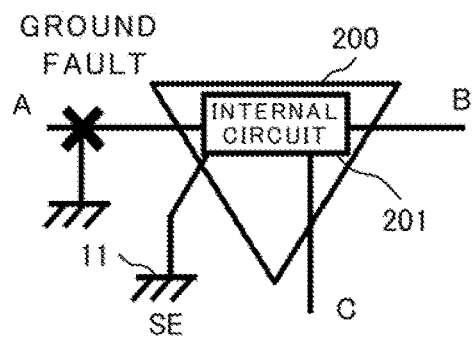
Figure 2D:
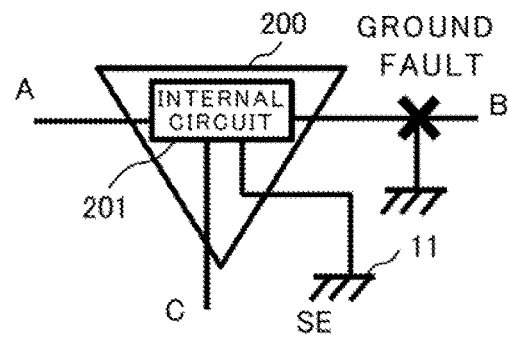
Figure 2E:
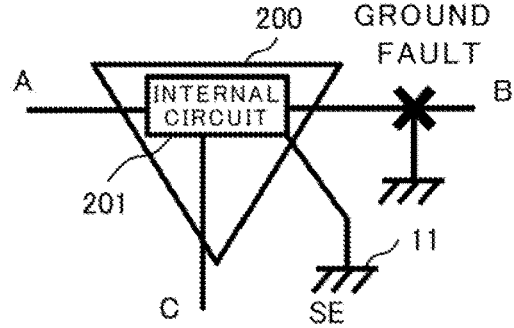

A configuration example of a power supply system according to the present example embodiment is similar to that of the power supply system 100 in FIG. 1. Further, a power supply system 100 according to the present example embodiment performs switching of a feed line as illustrated in FIG. 2A to FIG. 2E. A power supply switching device 200 of the power supply system 100 according to the present example embodiment differs from the power supply switching device 200 in FIG. 3 in a point described in the following. A part that is not described in the following is similar to the power supply switching device 200 in FIG. 3. In the following, a part of the power supply switching device 200 according to the present example embodiment that differs from the power supply switching device 200 in FIG. 3 is mainly described.

FIG. 4 is a conceptual diagram illustrating a configuration of the power supply switching device 200, which is an example of a power supply switching device according to the present example embodiment. In addition to the configuration of the power supply switching device 200 in FIG. 3, the power supply switching device 200 in FIG. 4 further includes an HVSW 5, a temperature sensor 13, and a heating protection circuit 14. The temperature sensor 13 is installed in the impedance circuit 12 or in adjacent to the impedance circuit 12. The heating protection circuit 14 is included in the internal circuit 201.

The control circuit 8 sends, according to a control optical signal described in the section of Background Art, a control signal for controlling the HVSW 5 to the HVSW drive circuit 9, in addition to control signals for controlling the HVSWs 1 to 4. The HVSW drive circuit 9 receives the control signal for controlling the HVSWS, and sends a drive signal to the HVSW 5.

The temperature sensor 13 measures a temperature of the impedance circuit 12 and sends a temperature signal indicating the temperature to the heating protection circuit 14.

The heating protection circuit 14 determines whether the temperature indicated by the temperature signal exceeds a threshold value. The threshold value is, for example, a value indicates that a branching unit is in a dangerous condition when a temperature exceeds the threshold value, or a value that exceeding the threshold value is inevitably leads the branching unit to be in a dangerous condition in a near future. The threshold value is preliminarily defined through an experiment or simulation, and stored in a storage unit accessible from, for example, the heating protection circuit 14. When determining that the temperature indicated by the temperature signal exceeds the threshold value, the heating protection circuit 14 sends an alarm signal indicating that the temperature exceeds the threshold value to the control circuit 8. The heating protection circuit 14 is, for example, a computer.

The control circuit 8 is, for example, a computer. When receiving the above-described alarm signal, the control circuit 8 causes the HVSW drive circuit 9 to stop operation of the HVSW 4. Thereby, the HVSW 4 remains in an on-state. Further, the control circuit 8 causes the HVSW drive circuit 9 to send, to the HVSW 5, a drive signal for causing the HVSW 5 to connect both terminals of the HVSW 5. Thereby, the HVSW 5 connects both terminals of the HVSW 5. Thereby, most current bypasses the impedance circuit 12 through the HVSW 5, and flows to the SE 11 without passing through the impedance circuit 12.

Note that, at a stage when the HVSW 5 connects both terminals of the HVSW 5, a voltage of the feed line 50 is decreased to some extent because current has flowed to the SE 11 via the impedance circuit 12 by then. Therefore, current flows through the feed line 50 due to the connection of both terminals of the HVSW 5 is low, and it is very unlikely that a defect occurs in an electrical component of the internal circuit 201.

Further, a reason for fixing the HVSW 4 to remain on before turning the HVSW 5 on is as follows. Specifically, the reason is in order to avoid a risk that rush current to SE 11 is produced due to on/off switching of the HVSW 4 while the HVSW 5 remains on and damage to the internal circuit 201 is caused by the rush current.

By causing current to the SE 11 to bypass the impedance circuit 12 through the HVSW 5, current that passes through the impedance circuit 12 is almost eliminated, and heat generation in the impedance circuit 12 is suppressed.

Subsequently, when the temperature of the impedance circuit 12 drops and the temperature indicated by the temperature signal sent from the temperature sensor 13 drops below the above-described threshold value, the heating protection circuit 14 stops sending the alarm signal to the control circuit 8. In that case, first, the control circuit 8 causes the HVSW drive circuit 9 to cause the HVSW 5 to isolate both terminals of the HVSW 5, and causes current flows from the feed line 50 to the SE 11 to pass through the impedance circuit 12. Then, the control circuit 8 releases the HVSW drive circuit 9 from a state of being unable to switch the HVSW 4.

Note that, a circuit having a predetermined impedance (hereinafter, referred to as an "inserted circuit") may be inserted in a current path 51 or 52 in a vicinity of the HVSW 5. In that case, a possibility that an electrical component of the internal circuit 201 is affected by current produced when the HVSW 5 connects both terminals of the HVSW 5 can be further reduced.

The larger the impedance of the inserted circuit, the more the possibility that an electrical component of the internal circuit 201 is affected by the current produced when the HVSW 5 connects both terminals of the HVSW 5 can be reduced. However, when the impedance of the circuit is increased, current that flows through the impedance circuit 12 increases. Therefore, a degree to which cooling of the impedance circuit 12 when the HVSW 5 connects both terminals of the HVSW 5 progresses is decreased. The impedance of the inserted circuit is determined based on a balance between a necessity of reducing the possibility that an electrical component is affected and a necessity of increasing a cooling speed of the impedance circuit 12, which are in a trade-off relationship with each other. When the possibility that an electrical component is affected is sufficiently low, the inserted circuit is not required.

Advantageous Effect

The power supply switching device according to the present example embodiment connects both end parts of the impedance circuit by the HVSW when a temperature of the impedance circuit exceeds a threshold value, and thereby reduces current flows through the impedance circuit. Therefore, the power supply switching device reduces heat generation in the impedance circuit and a branching unit accommodating the impedance circuit in a housing caused by current generated in grounding a feed line in the branching unit.

Note that, the grounding device according to the example embodiment, which is a part that relates to an operation of connecting both terminals of the impedance circuit by the HVSW when a temperature of the impedance circuit exceeds a threshold value, may not necessarily included in the branching unit. The grounding device may be included in another submarine device.

FIG. 5 is a conceptual diagram illustrating a configuration of a grounding device 200$x$, which is a minimum configuration of the grounding device according to the example embodiment. The grounding device 200$x$ includes a first connection unit 5$x$ and a determination unit 14$x$. The determination unit 14$x$ determines whether a temperature of an impedance circuit, which is a circuit that has a predetermined impedance and is to be connected between a sea earth and an in-submarine-device feed line that is installed in a submarine device and supplies power to an electrical component in the submarine device, exceeds a threshold value. When a result of the determination indicates that the temperature exceeds the threshold value, the first connection unit 5$x$ connects between both terminals of the impedance circuit.

With the above-described configuration, the grounding device 200$x$ connects both end part of the impedance circuit when the temperature of the impedance circuit exceeds the threshold value, and reduces current that flows through the impedance circuit. Thus, the grounding device 200$x$ reduces heat generated in grounding the feed line in the submarine device.

Thus, the grounding device 200$x$ achieves the advantageous effect described in the section of [Advantageous Effects of Invention].

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, a configuration of a component illustrated in each of the drawings is one example for facilitating understanding of the present invention, and is not limited to a configuration illustrated in these drawings.

Further, a part or the entirety of the above-described example embodiment may be described as the following supplementary notes, but is not limited thereto.

(Supplementary Note 1)

A grounding device including:
  a determination means for determining whether a temperature of an impedance circuit being a circuit that has a predetermined impedance and is to be connected between a sea earth and an in-submarine-device feed line that is installed in a submarine device and supplies power to an electrical component in the submarine device exceeds a threshold value; and
  a first connection means for connecting both terminals of the impedance circuit when a result of the determination indicates that the temperature exceeds the threshold value.

(Supplementary Note 2)

The grounding device according to supplementary note 1, further including
  a temperature measurement means for outputting information indicating the temperature.

(Supplementary Note 3)

The grounding device according to supplementary note 1 or 2, wherein
  the first connection means releases the connection when the temperature is equal to or lower than the threshold value.

(Supplementary Note 4)

The grounding device according to supplementary note 3, further including
    a second connection means for connecting the impedance circuit and the in-submarine-device feed line during a period from when the first connection means connects the both terminals until when the first connection means releases connection between the both terminals.

(Supplementary Note 5)

The grounding device according to any one of supplementary notes 1 to 4, further including:
    a first switching means for switching, between the in-submarine-device feed line and the sea earth, a connection destination of a first terminal connected to a power supply means of a first land station;
    a second switching means for switching, between the in-submarine-device feed line and the sea earth, a connection destination of a second terminal connected to a power supply means of a second land station; and
    a third switching means for switching, between the in-submarine-device feed line and the sea earth, a connection destination of a third terminal connected to a power supply means of a third land station.

(Supplementary Note 6)

The grounding device according to supplementary note 5, wherein,
    when a failure occurs in a feed line between the power supply means of the first land station and the first terminal and no failure occurs in a feed line between the second land station and the second terminal, the first switching means sets the connection destination of the first terminal to the sea earth, the second switching means seta the connection destination of the second terminal to the in-submarine-device feed line, and the third switching means sets the connection destination of the third terminal to the in-submarine-device feed line, and,
    when a failure occurs in a feed line between the power supply means of the second land station and the second terminal and no failure occurs in a feed line between the first land station and the first terminal, the second switching means sets a connection destination of the second terminal to the sea earth, the first switching means sets a connection destination of the first terminal to the in-submarine-device feed line, and the third switching means sets a connection destination of the third terminal to the in-submarine-device feed line.

(Supplementary Note 7)

The grounding device according to supplementary note 5 or 6, wherein,
    when a failure occurs in a feed line between the power supply means of the first land station and the first terminal and a failure occurs in a feed line between the second land station and the second terminal, the first switching means sets a connection destination of the first terminal to the sea earth, the second switching means sets a connection destination of the second terminal to the sea earth, and the third switching means sets a connection destination of the third terminal to the sea earth.

(Supplementary Note 8)

The grounding device according to any one of supplementary notes 1 to 3, wherein
    the first connection means operates according to a control optical signal sent through an optical cable.

(Supplementary Note 9)

The grounding device according to supplementary note 4, wherein
    the second connection means operates according to a control signal sent through an optical cable.

(Supplementary Note 10)

The grounding device according to any one of supplementary notes 5 to 7, wherein
    the first switching means, the second switching means, and the third switching means operate according to a control optical signal sent through an optical cable.

(Supplementary Note 11)

A grounding method including:
    determining whether a temperature of an impedance circuit being a circuit that has a predetermined impedance and is to be connected between a sea earth and an in-submarine-device feed line that is installed in a submarine device and supplies power to an electrical component in the submarine device exceeds a threshold value; and
    connecting both terminals of the impedance circuit when a result of the determination indicates that the temperature exceeds the threshold value.

(Supplementary Note 12)

A program recording medium recording a grounding program causing a computer to execute:
    processing of determining whether a temperature of an impedance circuit being a circuit that has a predetermined impedance and is to be connected between a sea earth and an in-submarine-device feed line that is installed in a submarine device and supplies power to an electrical component in the submarine device exceeds a threshold value; and
    processing of connecting both terminals of the impedance circuit when a result of the determination indicates that the temperature exceeds the threshold value.

Herein, the "submarine device" according to the above-described supplementary notes is, for example, a branching unit including the power supply switching device 200 in FIG. 4. Further, the "electrical component" is, for example, an electrical component constituting the internal circuit 201 in FIG. 4. Further, the "in-submarine-device feed line" is, for example, the feed line 50 in FIG. 4. Further, the "sea earth" is, for example, the SE 11 in FIG. 4.

Further, the "impedance circuit" is, for example, the impedance circuit 12 in FIG. 4. Further, the "determination unit" is, for example, the heating protection circuit 14 in FIG. 4. Note that, the determination unit corresponds to the determination means. Further, a "first connection unit" is, for example, the HVSW 5 in FIG. 4. The first connection unit corresponds to the first connection means.

Further, the "grounding device" is, for example, the power supply switching device 200 in FIG. 4. Further, a "temperature measurement unit" is, for example, the temperature sensor 13 in FIG. 4. Further, a "second connection unit" is, for example, the HVSW 4 in FIG. 4. Note that, the temperature measurement unit corresponds to the temperature measurement means.

Further, the "first land station" is, for example, a land station of which power supply unit is connected to the end part A of the feed line 101 in FIG. 4. Further, the "first terminal" is, for example, is a terminal between the end part A of the feed line 101 and the HVSW 1 in FIG. 4. Further, a "first switching unit" is, for example, the HVSW 1 in FIG. 4. Note that, the first switching unit corresponds to the first switching means. Further, the "second land station" is, for example, a land station of which power supply unit is connected to the end part B of the feed line 101 in FIG. 4.

Further, the "second terminal" is, for example, a terminal between the end part B of the feed line 101 and the HVSW 2 in FIG. 4.

Further, a "second switching unit" is, for example, the HVSW 2 in FIG. 4. Note that, the second switching unit corresponds to the second switching means. Further, the "third land station" is, for example, a land station of which power supply unit is connected to the end part C of the feed line 102 in FIG. 4. Further, the "third terminal" is, for example, a terminal between the end part C of the feed line 102 and the HVSW 3 in FIG. 4.

Further, a "third switching unit" is, for example, the HVSW 2 in FIG. 4. Note that, the third switching unit corresponds to the third switching means. Further, the "optical cable" is, for example, the optical fiber 301 in FIG. 4. Further, the "control optical signal" is, for example, the control optical signal included in the first optical signal in FIG. 4. Further, the "computer" is, for example, a computer included in the heating protection circuit 14 and the control circuit 8 in FIG. 4, or a computer including the heating protection circuit 14 and the control circuit 8. Further, the "grounding program" is, for example, a program for causing the computer to execute processing.

This application is based upon and claims the benefit of priority from Japanese patent application No. 2020-209805, filed on Dec. 18, 2020, the disclosure of which is incorporated herein in its entirety by reference.

REFERENCE SIGNS LIST 1, 2, 3, 4, 5 HVSW
5x First connection unit
6 Optical coupler
8 Control circuit
9 HVSW drive circuit
10 Power supply circuit
11 SE
12 Impedance circuit
13 Temperature sensor
14 Heating protection circuit
14x Determination unit
100 Power supply system
101, 102 Feed line
51, 52 Current path
200 Power supply switching device
200x Grounding device
201 Internal circuit
301 Optical fiber

What is claimed is:

1. A grounding device comprising:
a determination circuit configured to determine whether a temperature of an impedance circuit being a circuit that has a predetermined impedance and is to be connected between a sea earth and an in-submarine-device feed line that is installed in a submarine device and supplies power to an electrical component in the submarine device exceeds a threshold value;
a first connection circuit configured to connect both terminals of the impedance circuit when a result of the determination indicates that the temperature exceeds the threshold value;
a first switching circuit configured to switch, between the in-submarine-device feed line and the sea earth, a connection destination of a first terminal connected to a power supply circuit of a first land station;
a second switching circuit configured to switch, between the in-submarine-device feed line and the sea earth, a connection destination of a second terminal connected to a power supply circuit of a second land station; and
a third switching circuit configured to switch, between the in-submarine-device feed line and the sea earth, a connection destination of a third terminal connected to a power supply circuit of a third land station.

2. The grounding device according to claim 1, further comprising
a temperature measurement circuit configured to output information indicating the temperature.

3. The grounding device according to claim 2, wherein the first connection circuit releases the connection when the temperature is equal to or lower than the threshold value.

4. The grounding device according to claim 1, wherein the first connection circuit releases the connection when the temperature is equal to or lower than the threshold value.

5. The grounding device according to claim 4, further comprising
a second connection circuit configured to connect the impedance circuit and the in-submarine-device feed line during a period from when the first connection circuit connects the both terminals until when the first connection circuit releases connection of the both terminals.

6. The grounding device according to claim 1, wherein, when a failure occurs in a feed line between the power supply circuit of the first land station and the first terminal and no failure occurs in a feed line between the second land station and the second terminal, the first switching circuit sets a connection destination of the first terminal to the sea earth, the second switching circuit sets a connection destination of the second terminal to the in-submarine-device feed line, and the third switching circuit sets a connection destination of the third terminal to the in-submarine-device feed line, and,
when a failure occurs in a feed line between the power supply circuit of the second land station and the second terminal and no failure occurs in a feed line between the first land station and the first terminal, the second switching circuit sets a connection destination of the second terminal to the sea earth, the first switching circuit sets a connection destination of the first terminal to the in-submarine-device feed line, and the third switching circuit sets a connection destination of the third terminal to the in-submarine-device feed line.

7. The grounding device according to claim 1, wherein, when a failure occurs in a feed line between the power supply circuit of the first land station and the first terminal and a failure occurs in a feed line between the second land station and the second terminal, the first switching circuit sets a connection destination of the first terminal to the sea earth, the second switching circuit sets a connection destination of the second terminal to the sea earth, and the third switching circuit sets a connection destination of the third terminal to the sea earth.

8. The grounding device according to claim 1, wherein the first switching circuit, the second switching circuit, and the third switching circuit operate according to a control optical signal sent through an optical cable.

9. A grounding method comprising:
determining whether a temperature of an impedance circuit being a circuit that has a predetermined impedance and is to be connected between a sea earth and an in-submarine-device feed line that is installed in a submarine device and supplies power to an electrical component in the submarine device exceeds a threshold value;

connecting both terminals of the impedance circuit when a result of the determination indicates that the temperature exceeds the threshold value;

switching between the in-submarine-device feed line and the sea earth, a connection destination of a first terminal connected to a power supply circuit of a first land station;

switching between the in-submarine-device feed line and the sea earth, a connection destination of a second terminal connected to a power supply circuit of a second land station; and switching between the in-submarine-device feed line and the sea earth, a connection destination of a third terminal connected to a power supply circuit of a third land station.

10. A tangible and non-transitory program recording medium recording a grounding program causing a computer to execute:

processing of determining whether a temperature of an impedance circuit being a circuit that has a predetermined impedance and is to be connected between a sea earth and an in-submarine-device feed line that is installed in a submarine device and supplies power to an electrical component in the submarine device exceeds a threshold value;

processing of connecting both terminals of the impedance circuit when a result of the determination indicates that the temperature exceeds the threshold value;

processing of switching between the in-submarine-device feed line and the sea earth, a connection destination of a first terminal connected to a power supply circuit of a first land station;

processing of switching between the in-submarine-device feed line and the sea earth, a connection destination of a second terminal connected to a power supply circuit of a second land station; and processing of switching between the in-submarine-device feed line and the sea earth, a connection destination of a third terminal connected to a power supply circuit of a third land station.

* * * * *